3,533,914
METHOD OF PRODUCING L-GLUTAMIC ACID BY FERMENTATION

Shinji Okumura and Ryuichiro Tsugawa, Tokyo, and Hideo Kuronuma, Atsugi-shi, Japan, assignors to Ajinomoto Co., Inc., and Sanraku Ocean Co., Ltd., both of Tokyo, Japan
No Drawing. Filed Nov. 21, 1967, Ser. No. 684,614
Claims priority, application Japan, Dec. 1, 1966, 41/78,793
Int. Cl. C12b *1/00;* C12d *3/00*
U.S. Cl. 195—30                                                3 Claims

ABSTRACT OF THE DISCLOSURE

All microorganisms capable of producing L-glutamic acid from conventional culture media can convert acetate ions as the principal carbon source to glutamic acid in high yields under aerobic conditions if the culture medium contains minor amounts of assimilable carbohydrates during the growth stage of the microorganisms.

BACKGROUND OF THE INVENTION

This invention relates to the production of L-glutamic acid by fermentation, and particularly to the conversion of acetate ions as the primary carbon source to glutamic acid.

Tsunoda et al. (J. Gen. Appl. Microbiol. 7, 18, 1961) showed that most microbes capable of producing L-glutamic acid from sugar can also produce L-glutamic acid using acetic acid as a carbon source. However, the yields of glutamic acid were low, and acetate was found to inhibit fermentation.

Tanaka et al. (U.S. Pat. No. 3,335,065, also French Pat. 1,424,809) newly discovered a microorganism which is capable of producing glutamic acid from acetic acid as the sole carbon source, but the yield is lower than that usually obtained in media containing assimilable saccharides.

Phillips (U.S. Pat. 3,227,625) also disclosed microorganisms which can convert acetates into glutamic acid. The fermentation rate, however, is slower and the concentration of glutamic acid accumulated in the broth is lower than the corresponding values in fermentation processes now in industrial operation and using sugars as a carbon source.

SUMMARY OF THE INVENTION

We now have found that the fermentation rate, yield and ultimate concentration of L-glutamic acid in a fermentataion broth containing acetate ions as the principal source of carbon can be greatly increased by the presence of a small amount of sugar in the fermentation medium during the initial or growth phase of the fermentation. Thereafter, acetate ions may be fed to the medium as the sole carbon source. When performed under favorable conditions, the method of the invention is superior to the established methods of producing L-glutamic acid by fermentation of sugar.

The simultaneous presence of sugar and aceate ions (hereinafter referred to as acetic acid regardless of the cation present) does not result in an increase of cell density in the medium, which could account for the higher yield, nor can the higher yield and higher fermentation rate be explained as being merely the sum of the predictable effects of sugar and acetic acid. The sugar appears to cooperate synergistically with the acetic acid to produce the enzyme system necessary for conversion of additional acetic acid to glutamic acid. The inhibition of the fermentation by acetate, which has been reported by others, cannot be observed in cultures to which sugar was available during the growth phase.

The sugars employed in the method of this invention are the usual assimilable saccharides, such as glucose, fructose, sucrose, or maltose. They may be supplied in the form of impure mixtures, such as starch hydrolyzate or molasses. They may be present in the culture medium at the time of inoculation, or they may be added during the growth phase. Sugar additions made after the growth phase of the microorganism are ineffective.

While smaller amounts of sugars produce demonstrable results, significant economic advantages are gained at initial sugar concentrations of 0.3 g./dl. or more in the fermentation medium. The ratio of sugar to total acetic acid equivalent added should be between 5 and 30% with best results usually obtained with 10 to 25 percent sugar.

Aside from acetic acid as the main carbon source, the fermentation medium must contain a nitrogen source, and the usual inorganic and organic nutrients required for microbial growth. Ammonium acetate may serve simultaneously as a source of acetate ions and of nitrogen, but all conventional nitrogen sources including other ammonium salts, ammonia, nitrates, amino acids, and the like are useful. All soluble acetates which are not harmful to the microorganisms and free acetic acid may provide the necessary acetate ions, the ammonium, sodium and potassium salts being preferred, in addition to the free acid.

The following examples are further illustrataive of the present invention but it will be understood that the invention is not limited thereto.

DESCRIPTION OF PREFERRED EMBODIMENTS

Example 1

*Brevibacterium lactofermentum* No. 2256 (ATCC No. 13869) was cultured on bouillon agar slants for 24 hours, and was then used for inoculating three 20 ml. batches of an aqueous culture medium which contained a carbon source and biotin in the amounts listed in Table 1, and additionally 0.1% $KH_2PO_4$, 0.04% $MgSO_4, 7H_2O$, 2 p.p.m. each of $Mn^{++}$ and $Fe^{++}$, 200 $\gamma$/liter of vitamin $B_1 \cdot HCl$ and 0.1% vitamin-free casamino acid (DIFCO). The sterile media were cultured aerobically at pH 7.4 in Sakaguchi type shaking flasks for 24 hours at 31.5° C., whereupon the glutamic acid present in the broth was determined. The yield of glutamic acid is listed in Table 1. The optical density (O.D.) values listed were measured at 562 m$\mu$ on culture medium samples diluted 26 times.

TABLE 1

| Carbon source | Biotin ($\gamma$/L) | Growth O.D. | Glutamic acid yield, g./dl. |
|---|---|---|---|
| 3.0% amm. acetate | 1.0 | 0.36 | 0.31 |
|  | 1.5 | 0.39 | 0.43 |
| 0.5% glucose | 1.0 | 0.20 | 0.29 |
|  | 1.5 | 0.22 | 0.25 |
| 3.0% amm. acetate + 0.5% glucose | 1.0 | 0.37 | 0.91 |
|  | 1.5 | 0.41 | 0.8ɜ |

While the cell growth is not materially increased by the addition of glucose to the acetate medium, the yield is at least doubled, and much higher than the combined yield of media containing the acetate and the glucose respectively as carbon sources.

Example 2

The procedure of Example 1 was repeated in part with culture media containing 3.0% ammonium acetate and 2.5% ammonium acetate+0.5% glucose as carbon sources respectively. Growth and glutamic acid were determined after 12 hours and after 24 hours. G.A. in the following Table 2 and in other tables hereinafter is glutamic acid.

TABLE 2

| Carbon source | (A/L) | After 12 hours | | After 24 hours | |
|---|---|---|---|---|---|
| | | O.D. | G.A. q./dl. | O.D. | G.A. g./dl. |
| Ammonium acetate only | 1.0 | 0.12 | 0.04 | 0.36 | 0.31 |
| | 1.5 | 0.20 | 0.02 | 0.39 | 0.43 |
| Ammonium acetate plus glucose | 1.0 | 0.31 | 0.18 | 0.35 | 0.80 |
| | 1.5 | 0.39 | 0.12 | 0.40 | 0.65 |

While the growth values in both media after 24 hours are similar, the sugar greatly enhances growth in the first 12 hours, and enhances and accelerates the production of glutamic acid.

Example 3

Three culture media were prepared from a stock solution containing 0.1% $KH_2PO_4$, 0.04% $MgSO_4.7H_2O$, 2 p.p.m. each of $Mn^{++}$ and $Fe^{++}$, and 1 ml./dl. Aji-eki (a commercial soybean protein hydrolyzate), and the following additional ingredeints:

Medium A.—3% glucose, 0.8% ureau, 3.0 $\gamma$/l. biotin
Medium B.—1.5% glucose, 1% ammonium acetate, 1% sodium acetate (1.5% total as acetic acid), 0.3% urea 1.5 $\gamma$/l. biotin
Medium C.—2.9% ammonium acetate, 1.0% sodium acetate (3.0% total acetic acid equivalent), 0.5 $\gamma$/l. biotin 30 ml. of each medium were inoculated under sterile conditions in a 500 ml. shaking flask with Brevibacterium lactofermentum No. 2256 as in Example 1. After 15 hours culturing at 31.5° C., the cultures were centrifuged, the cells were washed twice with water and starved for 2 hours. 20 ml. batches of cell suspensions were then prepared from 60–80 mg. of the intact cells (on a dry basis), 1% ammonium acetate, and M/100 phosphate buffer (pH 7). Each suspension was shaken under aerobic conditions for 6 hours at 31.5° C. in a 500 ml. flask. The amount of glutamic acid, cell growth, and the yield of converted acetate were then determined. The results are listed in Table 3.

TABLE 3

| Source of cells | O.D. | Glutamic acid, g./dl. | Yield, percent |
|---|---|---|---|
| Medium A | 0.38 | 0.130 | 16.6 |
| Medium B | 0.46 | 0.358 | 45.8 |
| Medium C | 0.46 | 0.088 | 11.3 |

The microorganism initially cultured on a mixture of acetate and sugar acquire the ability to convert acetic acid to glutamic acid in the absence of sugar at a much higher rate than microorganisms not simultaneously exposed to acetic acid and sugar in the growth phase.

Example 4

A culture medium was prepared from the stock solution of Example 3, 2% ammonium acetate, 1% sodium acetate, 200 $\gamma$/l. vitamin $B_1$.HCl, and 1 $\gamma$/l. biotin, and adjusted to pH 7.5. Two sterilized 20 ml. batches were inoculated with Brevibacterium lactofermentum No. 2256 after one of the two batches had additionally been mixed with 0.5% glucose.

The glutamic acid accumulated in each medium was determined after 24 hours' shaking at 31.5° C., and 1.26 g./dl. were found in the glucose containing medium and 0.62 g./dl. in the acetate medium without glucose. The yield in the latter was 27.0% calculated on the acetic acid initially present whereas the yield in the glucose bearing medium was 45.1%, calculated on the combined carbon sources (acetic acid+glucose).

The additional 0.64 g. glutamic acid formed in the presence of the glucose, however, could not have come from the glucose because the conversion of glucose to glutamic acid is known not to exceed 50% under favorable conditions. It must be concluded that acetic acid was converted to glutamic acid more effectively in the presence of the small amount of glucose added.

Example 5

Several 20 ml. batches of a culture medium were prepared from the stock solution of Example 3, 2% ammonium acetate, 0.5 $\gamma$/l. biotin, and 100 $\gamma$/l. vitamin $B_1$.HCl, with and without 0.3% glucose, at pH 7.5. The several batches were inoculated with the microorganisms listed in Table 4, and the glutamic acid yield from acetate in each medium was determined after 24 hours shaking at 31.5° C.

TABLE 4

| | L-glutamic acid, yield, percent | |
|---|---|---|
| Microorganism | Without glucose | With glucose |
| Brev. flavum No. 2247 (ATCC 14067) | 25.0 | 40.0 |
| Brev. roseum No. 7 (ATCC 13825) | 9.0 | 45.3 |
| Brev. lactoferm. No. 2256 | 34.0 | 48.2 |
| Cory. acetoacidophilum No. 410 (ATCC 13870) | 23.0 | 4.05 |

Example 6

All glutamic acid producing microorganisms of the genera Micrococcus, Corynebacterium, Brevibacterium, and Arthrobacter gave increased yields of glutamic acid from acetic acid media when the latter additionally contained small amounts of glucose as partly illustrated by the results listed in Table 5 for fermentation of culture media made up from 0.5% $KH_2PO_4$, 0.04% $MgSO_4.7H_2O$, 2 p.p.m. $Mn^{++}$, 2 p.p.m. $Fe^{++}$, 200 $\gamma$/l. vitamin $B_1$.HCl, 01% casamino acid, 05 $\gamma$/l biotin, and the following carbon and additional nitrogen sources:

Medium A—2% ammonium acetate
Medium B.—2% ammonium acetate, 0.5% starch hydrolyzate (based on reducing sugar)
Medium C.—0.5% starch hydrolyzate, 0.2% urea 20 ml. batches of each medium were sterilized at 110° C. for 10 minutes in 500 ml. shaking flasks and adjusted to pH 7.0. They were then inoculated with the listed strains which had been pre-cultured on bouillon agar slants for 24 hours. Fermentation proceeded for 24 hours at 31.5° C., whereupon growth and glutamic acid were determined.

TABLE 5

| | Growth O.D. | | | Glutamic acid g./dl. | | |
|---|---|---|---|---|---|---|
| | Medium | | | | | |
| Microorganism | A | B | C | A | B | C |
| Brevs lactofermentum No.2362 (ATCC 13655) | 0.15 | 0.20 | 0.13 | 0.56 | 0.92 | 0.23 |
| Brev. flavum No. 1223 (ATCC 13286) | 0.16 | 0.19 | 0.11 | 0.54 | 0.88 | 0.26 |
| Brev. saccholyticum No. 7636 (ATCC 14066) | 0.14 | 0.17 | 0.12 | 0.53 | 0.85 | 0.23 |
| Brev. immariophilium No. 2237 (ATCC 14068) | 0.26 | 0.30 | 0.20 | 0.39 | 0.68 | 0.20 |
| Micrococcus glutamicus No. 534 (ATCC 13032) | | | | | | |
| Micrococcus glutamicus No. 541 (ATCC 13058) | 0.17 | 0.14 | 0.15 | 0.60 | 0.91 | 0.21 |
| Cory. callunae (NRRL 2344) | 0.13 | 0.24 | 0.13 | 0.09 | 0.69 | 0.05 |
| Cory. lilium (NRRL 2243) | 0.22 | 0.24 | 0.12 | 0.59 | 0.92 | 0.22 |
| Cory. herculis (ATCC 13868) | 0.23 | 0.19 | 0.14 | 0.50 | 0.75 | 0.16 |
| Arthrobacter citreus 23–2A (ATCC 17775) | 0.17 | 0.34 | 0.30 | 0.04 | 0.12 | 0.05 |

The following Examples 7 to 9 illustrates the production of glutamic acid on a larger scale by the method of the invention. Glutamic acid producing microorganisms are first cultured on a medium containing acetic acid as the main carbon source in a relatively low concentration together with at least 0.3 g./dl. sugar. From approximately the middle of the logarithmic period, acetic acid or acetates are fed to the broth whose pH is kept between 7.0 and 9.0.

The yield and fermentation rate may be increased further by adding dicarboxylic acids having four carbon atoms to the fermentation medium which contains acetic acid as the principal carbon source. Surface active agents are also beneficial in a manner well known in this art.

Example 7

Brevibacterium lactofermentum No. 2256 (ATCC 13869) was aerobically cultured with shaking for 8 hours at 31° C. in a seed culture medium of the following composition:

Starch hydrolyzate—1.5% (as glucose)
Ammonium acetate—0.5%
Sodium acetate—0.5%
Aji-eki—1.0 ml./dl.
Vit. $B_1$-hydrochloride—200 γ/l.
Biotin—2 γ/l.
Urea—0.4%
$KH_2PO_4$—0.1%
$MgSO_4 \cdot 7H_2O$—0.04%
$Fe^{++}$, $Mn^{++}$—2 p.p.m. each
pH—7.4

150 ml. batches of the seed culture were then used for inoculating 3 liters each of culture media A and B in 5 liter jars. Medium A had the following composition:

Ammonium acetate—1%
Sodium acetate—1%
Starch hydrolyzate (as reducing sugar)—2.5%
Biotin—2.5 γ/l.
Aji-eki—1.5 ml./dl.
Vit. $B_1$-hydrochloride—200 γ/l.
Urea—0.5%
$KH_2PO_4$—0.1%
$MgSO_4 \cdot 7H_2O$—0.04%
$Fe^{++}$, $Mn^{++}$—2 p.p.m. each
pH—7.3

Medium B had the same composition, except for the absence of the starch hydrolyzate. Both cultures were kept at 31.5° C. under aerobic conditions until the microbial growth had reached a satisfactory level, and a 1:1 aqueous mixture of acetic acid and ammonium acetate was then fed to the two cultures to keep the pH between 7.8 and 8.0.

The total amount of acetic acid and acetate (calculated as acetic acid) reached 11.2 g./dl. in medium A in 40 hours, and 6.72 g./dl. of L-glutamic acid was accumulated in medium A. Assuming a 50% conversion of the sugar in medium A to glutamic acid, the yield of glutamic acid from acetate ion in medium A was 53.2%. Only 2.7 g./dl. glutamic acid were formed in medium B for a conversion rate of only 28.1% based on acetate.

After removal of the microbial cells, 142 g. crude crystalline L-glutamic acid was recovered from medium A by pH adjustment to 3.2.

EXAMPLE 8

The procedure of Example 7 was repeated with Brevibacterium flavum No. 2247, Brevibacterium roseum No. 7, Micrococcus glutamicus No. 541, Corynebacterium lilium, and Corynebacterium acetoacidophilum No. 410. The amount of glutamic acid found in the broth (G.A.), the yield based on acetate ion, and the total amount of acetic acid consumed (ac. ac.) are listed separately for medium A and B in Table 6.

TABLE 6

| Microorganism | Medium A | | | Medium B | | |
|---|---|---|---|---|---|---|
| | G.A. g./dl. | Yield, percent | Acetic acid, g./dl. | G.A. g./dl. | Yield, percent | Acetic acid, g./dl. |
| Brev. flavum No. 2247 | 7.10 | 52.0 | 11.25 | 2.90 | 30.2 | 9.65 |
| Brev. roseum No. 7 | 7.32 | 55.3 | 11.37 | 2.62 | 29.5 | 8.89 |
| M. glutamicus No. 541 | 6.33 | 48.9 | 10.40 | 2.13 | 24.3 | 8.76 |
| Cory. lilium | 6.62 | 50.6 | 10.60 | 2.63 | 31.2 | 8.43 |
| Cory. acetoac. No. 410 | 6.45 | 46.9 | 11.10 | 2.30 | 25.3 | 9.10 |

EXAMPLE 9

Seed cultures of Brevibacterium lactofermentum No. 2256, Micrococcus glutamicus No. 541, and Corynebacterium acetoacidophilum No. 410 were prepared as described in Example 7 by 10 hours of culturing at 31° C. Duplicate batches of medium B (without sugar) described in Example 7 were inoculated with 150 ml. (5%) of the seed cultures, and the main fermentation was carried out as described in that example. Glucose (2 g./dl.) was added to one of each pair of fermenters after 5 hours. The results achieved are listed in Table 7 below in the same manner as in Table 6.

TABLE 7

| Microorganism | With glucose | | | Without glucose | | |
|---|---|---|---|---|---|---|
| | G.A. g. dl. | Yield, percent | Acetic acid, g. dl. | G.A. g. dl. | Yield, percent | Acetic acid, g. dl. |
| Brev. lactofermentum | 6.38 | 50.3 | 10.20 | 2.70 | 28.1 | 9.60 |
| M. glutamicus No. 541 | 5.83 | 45.8 | 10.00 | 2.13 | 24.3 | 8.76 |
| Cory. acetoac. No. 410 | 5.65 | 43.6 | 10.10 | 2.30 | 25.3 | 9.10 |

While the invention has been described with particular reference to specific embodiments, it is to be understood that it is not limited thereto, but is to be construed broadly and restricted solely by the scope of the appended claims.

What is claimed is:

1. In a method of producing glutamic acid by fermentation of a culture medium by a glutamic acid producing microorganism, the culture medium containing acetate ions as the principal source of assimilable carbon, the improvement which comprises:
    (a) maintaining an amount of assimilable sugar in said medium during the growth period of said microorganisms; and
    (b) feeding a source of acetate ions to said medium as the principal source of carbon after said growth period,
    (c) the ratio of said sugar to the total amount of acetate ions added to said medium being between 5% and 30%, based on acetic acid equivalents.

2. In a method as set forth in claim 1, the initial concentration of said sugar in said medium being at least 0.3 g./dl.

3. In a method as set forth in claim 1, said microorganism being a strain of the genera Micrococcus, Corynebacterium, Brevibacterium, and Arthrobactere.

References Cited

UNITED STATES PATENTS 3,117,915  1/1964  Shiio et al. _____ 195—30
3,227,625  1/1966  Phillips et al. _____ 195—30
3,411,990  11/1968  Udagawa et al. _____ 195—30

A. LOUIS MONACELL, Primary Examiner

G. M. NATH, Assistant Examiner

195—29, 47